United States Patent [19]

Robert et al.

[11] Patent Number: 5,610,114
[45] Date of Patent: Mar. 11, 1997

[54] CATALYST FOR THE POLYMERIZATION OF DIOLEFINS, METHOD FOR ITS PREPARATION, AND ITS USE FOR THE PREPARATION OF POLYMERS

[75] Inventors: Pierre Robert, Clermont-Ferrand; Roger Spitz, St-Symphorien-D'Ozon, both of France

[73] Assignees: Compagnie Generale Des Estab. Michelin-Michelin & Cie, Clermont-Ferrand Cedex; Elf Atochem S.A., Puteaux, both of France

[21] Appl. No.: 510,406

[22] Filed: Aug. 2, 1995

Related U.S. Application Data

[63] Continuation of Ser. No. 156,029, Nov. 19, 1993, abandoned.

[30] Foreign Application Priority Data

Nov. 23, 1992 [FR] France ................................. 92 14145

[51] Int. Cl.⁶ ........................................................ C08F 4/52
[52] U.S. Cl. ............................ 502/115; 502/104; 502/107; 502/110; 502/113; 502/117
[58] Field of Search ................................. 502/104, 107, 502/110, 113, 115, 117; 526/124.3, 124.7, 124.8, 124.9, 125.5, 125.8

[56] References Cited

U.S. PATENT DOCUMENTS 4,384,982  5/1983  Martin .................................. 252/429 B
4,461,883  7/1984  Takeuchi et al. ....................... 526/139
4,696,475  9/1987  Tomita et al. .......................... 273/227

FOREIGN PATENT DOCUMENTS 58-61107  4/1983  Japan.

OTHER PUBLICATIONS

Derwent Abstract 83-48192K (1983).

*Primary Examiner*—Romulo H. Delmendo
*Attorney, Agent, or Firm*—Brumbaugh, Graves, Donohue & Raymond

[57] ABSTRACT

A supported solid catalyst which can be used for the polymerization and copolymerization of conjugated dienes having as its basis the reaction product of:

A) a solid $MgCl_2$ support,

B) an ether, preferably THF, as swelling agent for the support,

C) a metal salt selected from among metals having an atomic number of between 57 and 71 or 92 in the periodic table of elements and, if the metal salt is not a halide, D) a halogenation agent selected from the group consisting of a halogenated compound of aluminum and a halogenated compound not containing aluminum, the reaction solid being free from the swelling agent, plus E) an organic derivative of aluminum which is obligatory when the halogenation agent is not a halogenated compound of aluminum and optional when the halogenation agent is a derivative of aluminum.

Also, a method of preparing this catalyst.

20 Claims, No Drawings

5,610,114

CATALYST FOR THE POLYMERIZATION OF DIOLEFINS, METHOD FOR ITS PREPARATION, AND ITS USE FOR THE PREPARATION OF POLYMERS

This application is a file-wrapper continuation of application Ser. No. 08/156,029, filed on Nov. 19, 1993, now abandoned.

BACKGROUND OF THE INVENTION

The present invention relates to a supported solid catalyst which is capable of presenting high catalytic activity and can be used for the polymerization of conjugated dienes, to the method of preparing it, and to its use for the preparation of polymers and copolymers of conjugated dienes.

The use of lanthanides as polymerization catalysts for conjugated dienes is well known to the person skilled in the art.

Various catalytic compositions having a base of rare earths have been described, in particular with rare-earth halides. Thus, Sci. Sin. 13(8):1339, 1964, describes the use of yttrium trichloride and Belgian Patent No. 644 291 describes the use of cerium trichloride. However, by reason of the very poor solubility of these salts in the aliphatic or aromatic hydrocarbon solvents used as polymerization solvent, these catalytic compositions had a heterogenous character and a poor catalytic activity, which greatly limited their use on an industrial scale.

Various solutions have been described in order to overcome this drawback. Thus, the use of binary catalytic systems resulting from the reaction of a trialkyl aluminum compound with a rare earth trihalide complexed by electron donors has been described. The use of alcohol is described in the "Journal of Polymer Science—Polymer Chemistry 19:3345, 1980" and the use of tetrahydrofuran has been described in "Macromolecules 15:230, 1982".

As another solution, "Kaustschuk und Gummi Kunstoffe 22:293, 1969" has described the use of ternary catalytic systems resulting from the reaction of a rare earth carboxylate, particularly of neodymium, with a halogenating agent and a trialkyl aluminum compound, the halogenating agent possibly being a halogenated derivative of alkyl aluminum.

It has furthermore been proposed to use quaternary catalytic systems, as in European Patent No. 7027, which describes a catalytic system coming from the reaction of the reaction product of a Lewis base and a carboxylate of a metal of the lanthanide series with an organic compound of aluminum, an alkyl aluminum halide, and a conjugated diene.

Finally, more recently, the "Journal of Macromolecular Science—Chemistry, A 26(2§3):p.405–416, 1989" has described catalytic systems formed of neodymium complexes supported on a copolymer of acrylic acid with an olefin in the presence of an organic compound of aluminum and an alkyl aluminum halide.

SUMMARY OF THE INVENTION

The object of the present invention is a solid supported catalyst which is stable in time and is capable of having a high activity and of giving polymers and copolymers of conjugated dienes of desired microstructure without requiring difficult and/or complicated manners of operation for the carrying out thereof, such as those necessary with some of the catalytic systems previously mentioned. In particular, neither prepolymerization nor pretreatment is required.

Accordingly, the present invention provides a solid supported catalyst which can be used for the polymerization and copolymerization of conjugated dienes comprising metal atoms immobilized by a support, characterized by the fact that it comprises the reaction product A) of a solid support in the form of magnesium dihalide, B) a swelling agent of the support, C) at least one compound of a metal selected from among the metals having an atomic number of between 57 and 71 or 92 in Mendelyeev's periodic table of elements, and, if the metal compound is not in halide form, D) of at least one halogenation agent selected from the group consisting of a halogenated compound of aluminum represented by the formula $X_n AlR_{3-n}$ in which X represents chlorine, bromine, iodine or fluorine atoms, Al represents the aluminum atom, R represents an alkyl radical having one to fifteen carbon atoms, and n represents a number having a value of between 1 and 3, or a halogenated compound other than a halogenated derivative of aluminum having an exchangeable labile halogen, the reaction solid being free from the residual swelling agent after the reaction, plus E) an organic derivative of aluminum represented by the formula $X_m AlR'_{3-m}$ in which X represents a halogen, R' represents a hydrogen atom or an alkyl radical having from one to eight carbon atoms, the three substituents however not all simultaneously representing a hydrogen atom, m represents the value 0, 1 or 2, necessarily present when the halogenation agent does not contain aluminum and optionally present when the halogenation agent contains aluminum.

The solid support used in the present invention is a support the lattice planes of which can move apart under the action of a swelling agent. The solid support used is a magnesium dihalide, and preferably magnesium dichloride. The magnesium dichloride is preferably anhydrous, but it may contain a very small proportion of moisture.

The swelling agent used in the present invention must be capable of spreading the lattice planes of the support and must be able to be eliminated after reaction with the support. As such, ethers are suitable, preferably tetrahydrofuran.

The metal compound or compounds immobilized by the support which is used in the present invention is any compound of a metal selected from among metals having an atomic number of between 57 and 71 or 92 in Mendelyeev's periodic table of elements, present in isolated form or in the form of a mixture of several metals of different atomic numbers. Preferred metal compounds are trivalent salts of cerium, lanthanum, praseodymium or neodymium, the commercial mixture "didymium", the tetravalent salts of uranium, and very particularly neodymium trichloride or a trivalent or tetravalent salt of a carboxylic acid having from 2 to 12 carbon atoms, or a mixed salt of a carboxylic acid having from 2 to 12 carbon atoms dissolved in the presence of two carboxylic acids of different molecular weight, one having from 2 to 12 carbon atoms and the other having from 2 to 5 carbon atoms, in a solvent which is preferably toluene. By way of example of carboxylic acids which can form a metal salt, mention may be made of acetic, butyric, n-hexanoic, n-heptanoic, n-octanoic, ethyl-2-hexanoic and versatic acids.

The metal may be present in variable amounts in the metal salt while conferring catalytic activity. Thus, the metal may be present in the metal salt within a range of 1% to 20% by weight, referred to the weight of the unswollen support.

Preferably, it is present in an amount of 10% by weight referred to the weight of the unswollen support.

When the metal compound is present in the form of a carboxylate, it is necessary to use a halogenation agent in order to obtain a polymer or copolymer of conjugated dienes having a cis linkage of the monomer units.

The halogenation agent used in the present invention may be selected from the group consisting of:

a) a halogenated derivative of aluminum represented by the formula $X_nAlR_{3-n}$ in which the different terms have the significance indicated previously, as preferred examples of which we may cite dimethyl aluminum chloride, diethyl aluminum chloride, methyl aluminum dichloride, ethyl aluminum dichloride, aluminum sesquichloride, aluminum trichloride, diethyl aluminum iodide, and diethyl aluminum bromide, b) a halide having an exchangeable labile halogen, such as, for instance, the alkyl mono- or polyhalides, the vinyl halides, the benzyl halides and preferably butyl chloride, tertiobutyl chloride, benzyl chloride, bromobenzene, and hydrochloric acid, c) a metal halide which is not a derivative of aluminum, such as $PCl_5$, $ZnCl_2$ and $SnCl_4$.

When the halogenation agent is not a halogenated derivative of aluminum, the catalyst must comprise, in addition to the reaction product, an organic compound of aluminum represented by the formula $X_mAlR'_{3-m}$ in which the different terms have the meaning indicated above, while the presence of this compound is optional in the event that a compound containing aluminum and having the formula $X_nAlR_{3-n}$ is used as halogenation agent. By way of example of such compounds, mention may be made of diethyl aluminum hydride, diisobutyl aluminum hydride, triethyl aluminum, and triisobutyl aluminum.

The catalyst in accordance with the invention can be formed in accordance with two variants:

In accordance with a first variant, the catalyst is prepared by coprecipitation, carrying out the following steps in succession:

dissolving of the support in the swelling agent in the presence of the metal compound, at the boiling point of the swelling agent, adding the resultant solution to an inert hydrocarbon solvent at low temperature, that is to say less than 0° C. and preferably equal to or less than −40° C., recovering the solid obtained by the reaction of the support with the metal compound, washing the solid with an inert hydrocarbon solvent, extracting and/or complexing the swelling agent of the isolated solid.

This elimination of the swelling agent can be effected by a drying carried out at room temperature and then at a temperature of more than 100° C., more particularly between 100° C. and 150° C., and preferably close to 120° C., possibly followed by an additional drying with an extraction or complexing agent of the swelling agent of formula $X_nAlR_{3-n}$ in which all the terms have the same meaning as given above. As preferred extraction and/or complexing agent of the swelling agent, diethyl aluminum chloride is used.

halogenation, as known per se, with a halogenation agent when the starting metal salt is a metal carboxylate, washing with a hydrocarbon solvent of the halogenated reaction solid and then drying, adding to the dried reaction solid an organic aluminum compound of formula $X_mAlR'_{3-m}$ in which the terms have the meaning previously indicated, when the halogenation agent is not a compound having the formula $X_nAlR_{3-n}$ in which the terms have the meaning previously given, in order to constitute the active catalyst.

This first variant is applicable whatever the nature of the salt in which the metal compound is present, whether it be a halide or a salt of a carboxylic acid, and whether the latter be present itself in the form of a simple salt or in the form of a mixed salt.

In accordance with a second variant, which is a preferred variant embodiment, the catalyst is prepared by carrying out the following steps in succession:

dissolving the support in the swelling agent at the boiling point of the swelling agent, adding the resultant solution to an inert hydrocarbon solvent at low temperature, that is to say below −40° C., recovering the solid obtained by the reaction of the support with the swelling agent, washing the resultant solid with an inert hydrocarbon solvent, recovering the solid and then drying at room temperature and obtaining a swollen support having a molar ratio of support to swelling agent of 1:1.5, suspending the swelling support in an inert hydrocarbon solvent, adding to the suspension a solution of a metal mixed salt of a carboxylic acid having from 2 to 12 carbon atoms having reacted in an aromatic solvent at the boiling point of said solvent with two carboxylic acids of different molecular weight, one having from 2 to 12 carbon atoms and the other having from 2 to 5 carbon atoms, heating, with agitation, at a temperature below the boiling point of the solvent, the swelling support and the metal carboxylate solution, recovering the reaction solid, extracting and/or complexing the reaction solid of the swelling agent by drying at room temperature and then at a temperature above 100° C., preferably between 100° C. and 150° C. and more preferably close to 120° C., recovering the supported solid metal component having a molar ratio of support to swelling agent of 1:0.5, extracting the residual swelling agent and halogenating the metal component with a halogenation agent having a base of aluminum in solution in a hydrocarbon solvent, isolating and drying at room temperature the solid halogenated reaction compound, that is to say, the catalyst.

Preferably, the extraction and/or complexing agent of the residual swelling agent and the halogenating agent are a single compound having the formula $X_nAlR_{3-n}$ in which all the terms have the meaning already given above.

When the halogenation agent is a compound satisfying the formula $X_nAlR_{3-n}$, an organic compound of aluminum represented by the formula $X_mAlR'_{3-m}$ in which the different terms have the meaning given above can be included in the catalyst while its presence is indispensable as component of the catalyst when the halogenation compound does not satisfy the formula $X_nAlR_{3-n}$.

The catalyst of the present invention permits the polymerization of conjugated dienes and the copolymerization of conjugated dienes with themselves in order to lead to homopolymers and copolymers which are stereospecific in cis. By way of polymerizable diene monomers, mention may be made by way of example of butadiene-1,3, isoprene, 2,3-dimethyl butadiene, pentadiene-1,3, and methyl-2-pentadiene-1,3.

The polymerization effected with the catalyst in accordance with the invention is carried out in manner known per se. It is preferably carried out in the presence of an inert alicyclic, aliphatic or aromatic hydrocarbon solvent conventionally used for the solution polymerization of conjugated dienes. Aliphatic solvents, in particular, heptane and cyclohexane, are preferred.

The polymerization or copolymerization reaction is carried out at a temperature between 40° C. and 120° C., preferably at a temperature close to 60° C. The polymers and copolymers obtained by this method in accordance with the invention can be grafted, functionalized or jumped as known per se and can be used as main mixture component which can be used for the manufacture of rubber articles, in particular automobile tires.

DESCRIPTION OF PREFERRED EMBODIMENTS

The following non-limitative examples are given by way of illustration of the invention. In all the examples, the operation is carried out under argon and the solvents are previously dried on a molecular sieve of 3A° with sweeping by argon; the inherent viscosities are determined at 25° C. in solution of 1 g/liter in toluene.

EXAMPLE 1

Preparation of the catalyst

This example constitutes an embodiment of the catalyst according to the invention in accordance with the first variant method of preparation, namely by coprecipitation.

100 ml of tetrahydrofuran (THF) are introduced into a reactor, followed by 3 g of anhydrous magnesium chloride ($MgCl_2$) and 0.28 g of neodymium trichloride ($NdCl_3$). The reagents are heated at the boiling point of the THF until the magnesium chloride and neodymium chloride have completely dissolved. The resultant solution is then rapidly transferred into a 500-ml Schlenck tube containing 300 ml of heptane cooled to −50° C. by an ethanol/liquid-nitrogen bath. A solid is formed which is recovered and washed twice with 300 ml of heptane at room temperature.

After washing, the solid is dried under vacuum in a first step at room temperature and then at a temperature of 120° C. until it is of constant weight. 4.2 g of a green solid are obtained. This green composite product is then suspended in 20 ml of a molar solution of diethyl aluminum chloride in heptane and the reaction medium is agitated at 60° C. for 60 minutes.

The solid, which has assumed a blue color, is washed after recovery by simple decantation with 50 ml of heptane and then dried under vacuum at room temperature.

There are obtained 3 g of a blue reaction solid which constitutes the catalyst and which contains 1.4% by weight of neodymium, measured by atomic adsorption.

Method of polymerization

A suspension formed of 300 ml of heptane, 1.8 ml of a molar solution of triisobutyl aluminum and 45 mg of the catalyst which was previously obtained are introduced into a reactor. Thereupon 11.5 g of butadiene are dissolved in this suspension at 15° C. and the temperature brought to 60° C. for 40 minutes, whereupon the polymerization is halted by the addition of a polymerization stopping agent as known per se (methanol/acetone mixture), and 0.7 g of polybutadiene having the following microstructure are recovered:

content of cis-1,4 bonds: 98.2%
content of 1,2 bonds: 0.7%
content of trans-1,4 bonds: 1.1%
and an inherent viscosity of 4.5 dl/g.

EXAMPLE 2

Preparation of the catalyst by coprecipitation

The catalyst is produced by repeating the method of operation of Example 1, with the exception of the neodymium trichloride, which is replaced by 2.8 ml of an 0.74 molar solution of neodymium tricaproate in tetrahydrofuran. The neodymium tricaproate is prepared by reaction of a slightly acid aqueous solution of $NdCl_3$ with an aqueous solution of sodium caproate under stoichiometric conditions; the product obtained is dried under vacuum at 50° C. and then dissolved in tetrahydrofuran.

Method of polymerization

The manner of procedure of Example 1 is repeated, except that neodymium tricaproate is used and that the time of polymerization is 90 minutes. The catalyst used contains 0.4% by weight of neodymium. 0.2 g of polybutadiene are obtained having a content of cis-1,4 bonds of 98.1% and an inherent viscosity of 4.2 dl/g.

EXAMPLE 3

Preparation of the catalyst by coprecipitation

The catalyst is prepared by repeating the manner of operation of Example 1, except for the neodymium trichloride which is replaced by 5.95 ml of an 0.35 molar solution of neodymium tri(ethyl-2-hexanoate) in toluene.

Method of polymerization

The manner of operation of Example 1 is repeated, except that 13.2 mg of the previously prepared catalyst which contains 4.8% by weight of neodymium are used and that the polymerization is halted after 60 minutes.

5.2 g of polybutadiene are obtained having a cis-1,4 bond content of 98.1% and an inherent viscosity of 3.9dl/g.

EXAMPLE 4

This example constitutes a preferred embodiment of the catalyst of the invention, in accordance with the second, so-called "impregnation" variant.

Preparation of the catalyst

A) Preparation of the swelling support with the swelling agent in order to obtain an $MgCl_2$: 1.5 THF support. 2.7 grams of magnesium chloride are dissolved in THF in a Schlenck tube at the boiling point of said solvent until the $MgCl_2$ is completely dissolved. This solution is transferred rapidly into a second Schlenck tube containing 300 ml of heptane cooled by an ethanol/liquid nitrogen bath at −30° C. A solid is formed which is washed twice with 300 ml of heptane at room temperature, and then recovered and dried at room temperature. There are thus obtained 5.9 g of a white powder of $MgCl_2$: 1.5 THF.

B) Preparation of the neodymium mixed salt: synthesis of anhydrous neodymium tri(ethyl-2-hexanoate) dissolved in the presence of ethyl-2-hexanoic acid and acetic acid in toluene. 40 ml of water brought to a temperature of about 50° C. and 1.6 g, namely 40 millimols, of caustic soda are introduced into an Erlenmeyer flask. After dissolving, 6.32 g, namely 44 millimols, of ethyl-2-hexanoic acid are added, and the temperature is brought to 90° C. for the time necessary in order to obtain complete dissolving. To the solution thus obtained, there is added, with vigorous agitation while maintaining the temperature at 90° C., a solution of hydrated neodymium trichloride previously obtained by dissolving 4.8 g of $NdCl_3.6H_2O$, namely 13.3 millimols of $NdCl_3$, in 20 ml of water at 90° C., if necessary in the presence of hydrochloric acid so that the final pH of the $NdCl_3$ solution is between 1 and 2. After agitation for 30 minutes, during which the neodymium salt precipitates, the suspension is filtered and the neodymium salt is collected. This salt is washed abundantly with hot water and then dried under vacuum at 80° C. for 48 hours. 7.4 g of anhydrous neodymium tri(ethyl-2-hexanoate) are thereby obtained.

8.6 g, namely 15 millimols, of neodymium tri(ethyl-2-hexanoate) are placed in suspension in 50 ml of anhydrous toluene, whereupon 2.4 ml, namely 15 millimols, of ethyl-2-hexanoic acid and 0.86 ml, namely 15 millimols, of acetic acid are added. The medium is agitated with reflux of the toluene until the complete dissolving of the neodymium tri(ethyl-2-hexanoate). A solution of neodymium mixed salt is thus obtained.

C) Reaction of the support with the neodymium mixed salt.

2.8 g of the $MgCl_2$: 1.5 THF support are added to a Schlenck tube containing 10 ml of heptane and the resultant suspension agitated, adding 3.0 ml of a solution of the neodymium mixed salt.

The temperature of the reaction medium is brought to 80° C. for one hour, during which the agitation is continued, whereupon the reaction solid which has formed is isolated and dried first of all at room temperature until it is dry, and then heated under vacuum at 120° C. There are thus obtained 1.9 g of a green solid supported on $MgCl_2$: 0.5 THF.

D) Synthesis of the catalyst supported on magnesium chloride.

The supported green reaction solid is reacted with 20 ml of a molar solution of diethyl aluminum chloride in heptane and the reaction medium is agitated at 60° C. for 1 hour, whereupon the solid which has assumed a blue color is recovered, washed twice by simple decantation with 50 ml of heptane, and then dried under vacuum at room temperature. In this way, the active catalyst which contains 5.7% by weight neodymium is obtained.

Method of polymerization

The manner of operation of Example 1 is repeated except that 20.7 ml of the catalyst previously obtained are used and that the polymerization is carried out at 60° C. for minutes. 6.8 g of polybutadiene having a cis-1,4 bond content of 98% and an inherent viscosity of 4.1 dl/g are isolated.

EXAMPLE 5

This control example is intended to illustrate the importance of a swelling agent capable of spreading the lattice planes of the support.

Preparation of the reaction system

In a metal Schlenck tube of a volume of 100 ml containing 55 g of steel balls of different diameters there are introduced 7.9 g of anhydrous magnesium chloride and 1 g of 1,2,4,5-tetramethyl benzene.

The mixture is agitated with a Dangouman vertical oscillation agitator having a stroke of 6 cm and operating with a frequency of 7 Hertz, namely with an acceleration close of 60 m/sec² for 4 hours.

TEST A:

Preparation of the reaction system

To the support obtained there are added 10 ml of the neodymium mixed salt the preparation has been described in Example 4 under B. A solid is obtained which is recovered and then dried under vacuum at room temperature. This dried solid is then crushed for 4 hours, whereupon it is reacted with 20 ml dimethyl aluminum chloride by the method of operation described in Example 4 for step D. The solid reaction system is recovered.

Method of polymerization

The manner of operation of Example 1 is repeated except that 55 mg of the reaction system previously obtained are used and that polymerization is effected for 1 hour before halting it. At the end of this time, only traces of polybutadiene are obtained.

TEST B:

Preparation of the reaction system

The preparation is effected by repeating the manner of operation used for Test A except that the neodymium salt is replaced by 2 g of anhydrous $NdCl_3$.

Method of polymerization

The manner of operation of Example 1 is repeated except that 322.2 mg of the reaction mixture previously obtained with $NdCl_3$ are used and polymerization is effected for 1 hour before halting it. At the end of this time, there is obtained 1.5 g of a polymer the great majority of which is insoluble in the polymerization medium which is in the form of a gel.

EXAMPLE 6

This control example is intended to illustrate the importance of the neodymium mixed salt used in the preferred embodiment of the catalyst of the invention.

Preparation of the reaction system 2.9 g of the $MgCl_2$: 1.5 THF support are added to a Schlenck tube containing 10 ml of heptane, whereupon the resultant suspension is agitated, adding 0.66 ml of an 0.35 molar solution of neodymium tri(ethyl-2-hexanoate) in toluene, and using the method of operation described in Example 4 in steps C and D.

Method of polymerization

The manner of operation of Example 1 is repeated, except that 33.1 mg of the reaction solid previously obtained with neodymium tri(ethyl-2-hexanoate) are used and polymerization is effected for 175 minutes. There is obtained 1.5 g of a polybutadiene of high content of cis bonds, namely a yield much less than with the neodymium mixed salt used in Example 4.

EXAMPLE 7

The purpose of this example is to illustrate the importance of the variation of the molar ratios of each of the two carboxylic acids of different molecular weight used to prepare the neodymium mixed salt.

Preparation of the catalyst

Three tests are carried out in accordance with the conditions described in Example 4 with three solutions of neodymium mixed salt the concentrations of which, expressed in mole/liter and the neodymium contents by weight of the catalyst being set forth in Table 1:

TABLE 1

| Test | $(2Et\text{---}C_5H_{10}CO_2)_3Nd$ | $CH_3COOH$ | $(2Et\text{---}C_5H_{10}CO_2H)_3$ | Nd in % |
|---|---|---|---|---|
| 1 | 0.35 | $3.6 \cdot 10^{-2}$ | 0.35 | 7.0 |
| 2 | 0.35 | 0.35 | 0.35 | 5.7 |
| 3 | 0.35 | 0.7 | 0.35 | 4.0 |

In the case of the solution prepared to carry out Test No. 3, there is observed the formation of a precipitate which is not used; it is the supernatant which is used for the reaction of halogenation and extraction and/or complexing of the swelling agent.

Method of polymerization

The manner of operation of Example 4 is repeated with the three catalyst solutions previously prepared except that the weight of catalyst used and the duration of the polymerization are those indicated in Table 2, which also shows the amount of polybutadiene obtained with these three catalytic solutions and that of the control test carried out with the neodymium tri(ethyl-2-hexanoate).

TABLE 2

| Test | Weight of Catalyst in mg | Time in Minutes | Amount of Polybutadiene |
|---|---|---|---|
| 1 | 31.3 | 25 | 4.9 g |
| 2 | 20.7 | 20 | 6.8 g |
| 3 | 56.3 | 50 | 4 g |
| T | 33.1 | 175 | 1.5 g |

It will be noted that it is advantageous to use a neodymium octoate solution in which the molar ratio of the two carboxylic acids of different molecular weights is close to 1.

EXAMPLE 8

This example illustrates a variant embodiment of another neodymium mixed salt which can be used in the preferred embodiment of the catalyst of the invention.

Preparation of the catalyst

The manner of operation of Example 4 is repeated, except that butyric acid is used in place of the acetic acid and the following amounts of reagents are used:

neodymium tri(ethyl-2-hexanoate) in the form of an 0.35 molar solution of neodymium octanoate in toluene: 5 ml. ethyl-2-hexanoic acid: 0.32 ml butyric acid: 0.3 ml.

The catalyst obtained contains 6.3% by weight neodymium.

Method of polymerization

The manner of operation of Example 1 is repeated, except that 22 mg of the previously prepared catalyst is used and that polymerization is effected for 15 minutes. At the end of the polymerization reaction, 3.6 g of polybutadiene are obtained.

EXAMPLE 9

This example illustrates a variant embodiment of a catalyst in accordance with the invention, in which the metal is cerium.

Preparation of the catalyst

In this example, the same manner of operation is used as in Example 4, except that cerium is used in the place of neodymium and 9 ml of the cerium mixed salt obtained in a manner similar to the neodymium mixed salt are used. The solution of cerium tri(ethyl-2-hexanoate) used has a cerium concentration of 0.1 mol/liter, and the concentration of the two acids, acetic acid and ethyl-2-hexanoic acid, is also 0.1 mol/liter. The catalyst obtained contains 4.8% by weight of cerium.

Method of polymerization

The manner of operation of the Example 1 is repeated, except that 94.5 mg of the previously prepared catalyst are used and that the polymerization is halted after 20 minutes. 2.8 g of polybutadiene are obtained.

EXAMPLE 10

This example illustrates a catalyst according to the invention in which the metal is uranium.

Preparation of the catalyst

In this example, the manner of operation of Example 4 is repeated, except that uranium is used instead of neodymium and 9.5 ml of the uranium mixed salt obtained in a manner similar to the neodymium mixed salt are used. The catalyst obtained contains 3.3% by weight of uranium.

Method of polymerization

Manner of operation of Example 1 is repeated, except that 98.1 mg of the previously prepared catalyst are used instead of the neodymium mixed salt and the polymerization is halted after 55 minutes. 5 g of polybutadiene are obtained.

We claim:

1. A supported catalyst comprising metal atoms borne by the support, wherein the catalyst comprises the reaction product of:

a) a solid support which consists essentially of magnesium dihalide;

b) a swelling agent of the support, wherein the swelling agent is an ether;

c) at least one carboxylic acid salt of a metal selected from the group consisting of: rare-earth metals having an atomic number of between 57 and 71 in Mendelyeev's periodic table of elements and a metal having an atomic number of 92, wherein the carboxylic acid moiety thereof has from 2 to 12 carbon atoms; and d) a halogenation agent selected from the group consisting of: halogenated compounds of aluminum represented by the formula $X_nAlR_{3-n}$ in which X represents chlorine, bromine, iodine or fluorine atoms, Al represents aluminum, R represents an alkyl radical having one to fifteen carbon atoms, and n represents a number having a value of between 1 and 3; halogenated compounds not containing aluminum that have an exchangeable labile halogen; and if the halogenation agent is not a halogenated derivative of aluminum, (i) at least one organic derivative of aluminum represented by the formula $X_mAl(R')_{3-m}$ in which X represents a halogen atom, Al represents aluminum, R' a hydrogen atom or an alkyl radical having from one to eight carbon atoms, the substituents R' however not all representing a hydrogen atom simultaneously, m represents the value 0, 1 or 2, in which the organic derivative of aluminum is necessarily present when the halogenation agent is a halogen compound not containing aluminum and optionally present when the halogenation agent contains aluminum, wherein during the reaction the swelling agent spreads the lattice planes of the support, and after the reaction the swelling agent is extracted from the support.

2. A catalyst according to claim 1, wherein the swelling agent is tetrahydrofuran.

3. A catalyst according to claim 1, wherein the metal carboxylic acid salt is a mixed carboxylic acid salt of two carboxylic acids of different molecular weight, one having from 2 to 12 carbon atoms and the other having from 2 to 5 carbon atoms.

4. A catalyst according to claim 3, wherein the two carboxylic acids are ethyl-2-hexanoic acid and acetic acid.

5. A catalyst according to claim 1, wherein the metal is neodymium.

6. A method of preparing a supported catalyst comprising metal atoms immobilized by the support comprising the steps of:

(a) dissolving a support consisting essentially of magnesium dihalide and at least one carboxylic acid salt of a metal, wherein the carboxylic acid moiety thereof has from 2 to 12 carbon atoms, in a swelling agent, wherein the swelling agent is an ether, the support having lattice planes which are spread apart when the support is exposed to the swelling agent, wherein the metal is selected from the group consisting of rare-earth metals having an atomic number of between 57 and 71 in Mendelyeev's periodic table of elements and a metal having an atomic number of 92, to produce a solution;

(b) adding the solution to an inert hydrocarbon solvent and maintaining the resulting mixture at a temperature below 0° C., thereby allowing precipitation of a solid product comprising the support and the carboxylic acid salt;

(c) recovering the solid product;

(d) washing the solid product with an inert hydrocarbon solvent;

(e) drying to eliminate the swelling agent from the solid product; and (f) recovering the catalyst.

7. A method according to claim 6, wherein the support is magnesium chloride and the swelling agent is tetrahydrofuran.

8. A method of preparing a supported catalyst comprising metal ions immobilized by the support comprising the steps of:

(a) dissolving a support consisting essentially of substantially anhydrous magnesium dihalide in a swelling agent to produce a solution, wherein the swelling agent is an ether, the support having lattice planes which are spread apart when the support is exposed to the swelling agent;

(b) adding the solution to a hydrocarbon solvent;

(c) recovering from the hydrocarbon solvent a solid swollen support obtained by reaction of the support with the swelling agent;

(d) preparing at least one carboxylic acid salt of a metal selected from the group consisting of rare-earth metals having an atomic number between 57 and 71 and a metal having an atomic number of 92, the salt having a carboxylic acid moiety having from 2 to 12 carbon atoms;

(e) reacting the swollen support of step (c) with the carboxylic acid salt of step (d) in the presence of an inert hydrocarbon solvent to produce a solid reaction product;

(d) recovering the solid reaction product;

(e) partially extracting the swelling agent from the solid reaction product by drying the reaction product until the molar ratio of support to swelling agent is 1:0.5, to provide a first extracted solid reaction product;

(f) eliminating the swelling agent from the first extracted solid reaction product by washing the first extracted solid reaction product with an extraction agent, to produce a second extracted solid reaction product;

(g) halogenating the second extracted solid reaction product with a halogenation agent in the presence of an inert hydrocarbon solvent to produce a halogenated solid reaction product;

(h) where the halogenation agent contains no aluminum, adding an organic compound of aluminum; and (i) recovering the catalyst.

9. A method according to claim 8, wherein the magnesium dihalide is magnesium chloride, the swelling agent is tetrahydrofuran, and the extraction agent and the halogenation agent are each a single compound having the formula $X_nAlR_{3-n}$ in which X is a halogen, Al is aluminum, R is an alkyl group of 1 to 15 carbons and n is 1 to 3.

10. A method according to claim 8, wherein the carboxylic acid salt of the metal is neodymium tri(ethyl-2-hexanoate) dissolved in toluene in the presence of ethyl-2-hexanoic acid and acetic acid.

11. A method according to claim 6, wherein the drying step (e) is carried out first at room temperature and subsequently at a temperature greater than 100° C.

12. A method according to claim 6, further comprising extracting and/or complexing the swelling agent after drying step (e) by treatment with an extracting and/or complexing agent that can complex with and/or extract said swelling agent.

13. A method according to claim 12 wherein the extracting and/or complexing agent has the formula $X_nAlR_{3-n}$ wherein X is chlorine, bromine, iodine or fluorine, Al is aluminum, R is an alkyl group having one to fifteen carbons and n is 1 to 3.

14. A method according to claim 13 wherein the extracting and/or complexing agent is diethylaluminum chloride.

15. A method according to claim 7 wherein the metal carboxylic acid salt is a mixed carboxylic acid salt of two carboxylic acids of different molecular weight, one having from 2 to 12 carbon atoms and the other having from 2 to 5 carbon atoms.

16. A method according to claim 7, further comprising the steps of halogenating with a halogenation agent the solid product obtained after step (e) to obtain a halogenated solid product, washing said halogenated solid product with a hydrocarbon solvent drying said halogenated solid product and recovering the catalyst.

17. A method according to claim 16 wherein the halogenation reagent is selected from the group consisting of aluminum halide compounds having the formula $X_nAlR_{3-n}$, in which X is chlorine, bromine, iodine or fluorine, Al is aluminum, R is an alkyl group containing 1 to 15 carbons and n is 1 to 3, halogenated compounds not containing aluminum that have an exchangeable labile halogen and metal halides other than aluminum halides.

18. A method according to claim 17, where the halogenation agent does not contain aluminum, further comprising the steps of adding to the dried halogenated solid product an organic aluminum compound having formula $X_mAl(R')$, wherein X is a halogen, Al is aluminum, R' is hydrogen or an alkyl group having one to eight carbons and m is 0, 1 or 2, and where m is 0 or 1, the R' substituents are not all hydrogens, washing with an inert hydrocarbon solvent and drying, wherein a solid active catalyst is recovered.

19. A method according to claim 8 where the halogenation agent contains aluminum, further comprising optionally adding an organic compound of aluminum in association with the halogenation agent.

20. A method of preparing a supported catalyst according to claim 8, wherein the carboxylic acid salt is prepared by dissolving at least one first carboxylic acid salt of a metal selected from the group consisting of rare-earth metals having an atomic number between 57 and 71 and a metal having an atomic number of 92, the salt having a carboxylic acid moiety having from 2 to 12 carbons, in an aromatic solvent at the boiling point of the solvent in the presence of a first carboxylic acid having from 2 to 12 carbon atoms and a second carboxylic acid having from 2 to 5 carbon atoms.

* * * * *